Jan. 26, 1971 E. MORVAN 3,559,093

NOISE GENERATOR EMPLOYING A FEEDBACK PATH AROUND TWO CASCADED TRAVELLING-WAVE TUBES

Filed Dec. 17, 1968 2 Sheets-Sheet 2

United States Patent Office
3,559,093
Patented Jan. 26, 1971

3,559,093

NOISE GENERATOR EMPLOYING A FEEDBACK PATH AROUND TWO CASCADED TRAVELLING-WAVE TUBES

Eugène Morvan, Paris, France, assignor to CSF-Compagnie Generale de Telegraphie Sans Fil, a corporation of France Filed Dec. 17, 1968, Ser. No. 784,445
Claims priority, application France, Dec. 21, 1967, 133,225
Int. Cl. H03b 29/00
U.S. Cl. 331—78 3 Claims

ABSTRACT OF THE DISCLOSURE

A noise generator for production of uniformly distributed noise incorporating two travelling wave tubes in series connected by a feedback loop comprising connected in series a variable attenuator and if desired a band-pass filter.

Figure 1:
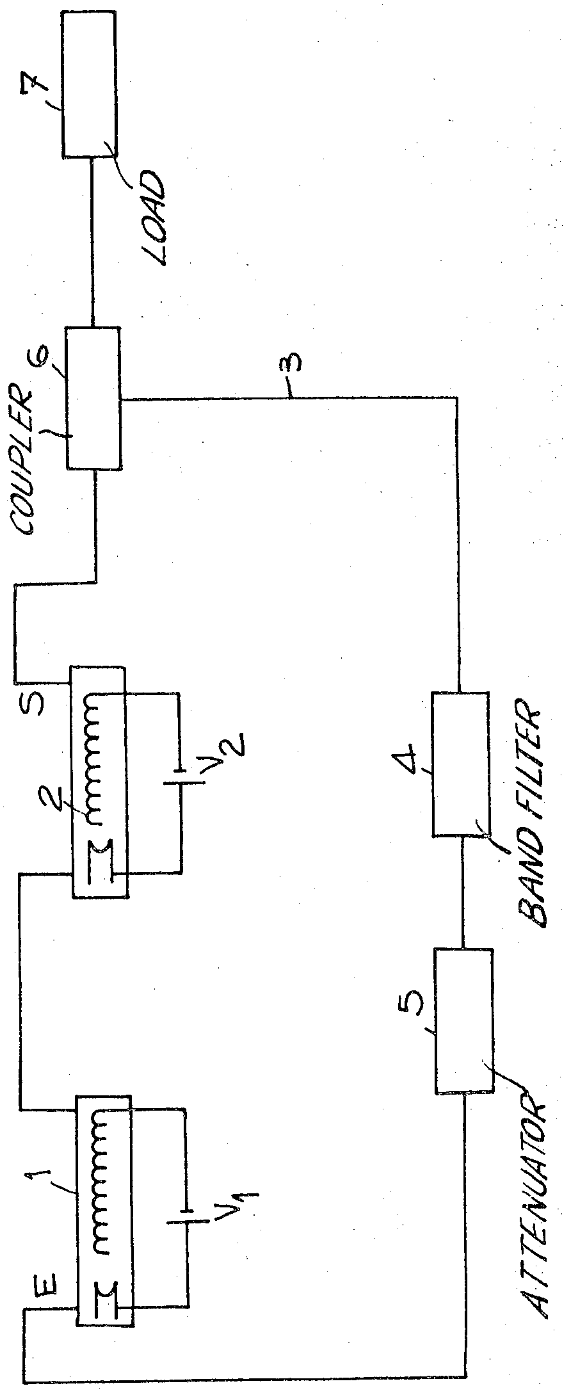

The present invention relates to noise generators.

It is known to build oscillator circuits by coupling the input and the output of a travelling wave amplifier by a feedback loop.

Self-sustaining oscillations occur if the gain is greater than 1, and if the total phase-shift, is equal to a whole number of wave cycles. This latter condition can roughly be translated, for a given circuit and for a given operating voltage, into an equation of the form $N\lambda=K$, where N is a whole number, K a constant and $\lambda$ the operating wavelength.

This condition is generally satisfied for a certain number of discrete frequencies corresponding in each case to a particular value of the whole number N, so that, a filter may be provided in the feedback loop in order to select one of the frequencies.

Such known oscillators cannot, as such, be used as noise generators, because of the discrete nature of the frequencies generated. Even the cross-modulation effect which can develop between the discrete frequencies, does not improve matters and the frequency spectrum obtained is always made up of distinct and quite separate bands. The same happens when several parallel feedback loops are provided instead of a single one, the spectrum then simply comprising a larger number of independent and distinct bands.

It is an object of the invention to avoid such drawbacks.

According to the invention, there is provided a noise generator. A noise generator comprising a travelling wave tube, having an input and an output, a feedback loop between said input and said output; and means in said feedback loop for damping high-amplitude frequency components and for boosting to higher amplitude low-amplitude frequency components, in which said means comprise a further travelling wave tube, connected in series with said first mentioned travelling wave tube.

Figure 2:
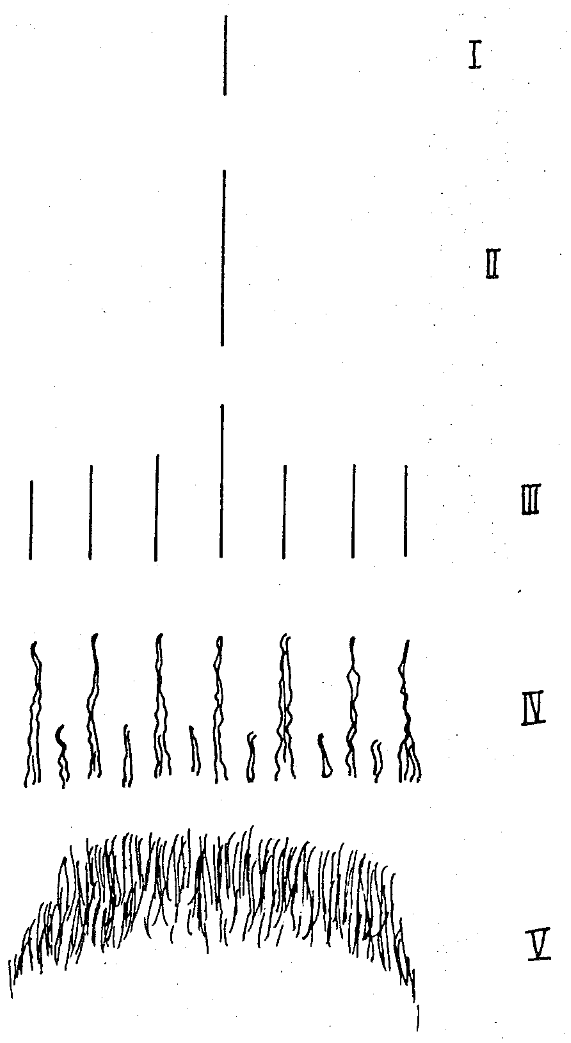

For a better understanding of the invention and to show how the same may be carried into effect reference will be made to the drawing accompanying the ensuing description and in which:

FIG. 1 shows a circuit diagram of a noise-generator according to the invention; and FIG. 2 diagrammatically shows different stages of operation of the noise-generator shown in FIG. 1.

The embodiment of the invention shown, by way of example, in FIG. 1 comprises: two travelling wave tubes 1 and 2, connected in series, and a feedback loop 3 connecting the output S of the tube 2 to the input E of the tube 1.

A band filter 4 is inserted in the feedback loop in series with a variable attenuator 5.

A coupler 6 is provided between the output S and a load 7.

In operation, the coupler 6 makes it possible to match the circuit, i.e. to reduce the degree of reflection from the load 7 sufficiently to ensure that the reflected energy may not, in the absence of the feedback loop, cause self-oscillation of the circuit, and also to control the power fraction picked up at the output of the tube 2 in order to supply the loop 3.

Under such conditions it is exclusively the energy supplied by the feedback loop 3 to the input E of the tube 1, which is responsible for the production of oscillations.

The device in accordance with FIG. 1 operates as follows:

Because of the coupling produced by the feedback loop 3, each signal which satisfies the condition $N\lambda=K$ hereinbefore stated, gives rise to an oscillation.

The intensity of the oscillation, can be varied by varying the damping action of the attenuator 5. However, it should be noted that in amplifiers the gain generally falls off as the input signal level increases. Accordingly, it is not possible to increase indefinitely the amplitude of an oscillation by reducing the attenuation which it experiences, and beyond a certain input signal level a saturation condition is reached beyond which the output signal continues to fall off instead of increasing.

Now, of all the signals, obviously it is those of highest amplitude which are the first to reach this saturation condition as the attenuation is reduced by operating the attenuator 5. Beyond this saturation condition, as the attenuation continues to be reduced, the amplitude of the oscillation at the corresponding frequency, progressively falls off whereas in the case of the frequencies corresponding to the low-amplitude signals, which are still far away from the saturation condition, the amplitude continues to rise.

This property is exploited by the invention in order, within the frequency spectrum, to so to speak merge together the distinct bands corresponding to the high-amplitude signals and amplify those corresponding to the low-amplitude signals. To this end a further travelling wave tube, the tube 2 is included in the circuit. Its function is to bring the signals of highest amplitude into the saturation condition by its own gain.

The presence of this second tube 2 is essential, because with a single travelling wave tube 1, the gain of which is barely 20 db, it would be impossible to achieve the desired degree of saturation in the high-amplitude signals.

These signals are those resulting from the interaction between the field of the delay circuit of the tube and the mean electron of the beam and indeed all those electrons which approach said mean electron in terms of their characteristics of initial velocity, energy and direction, and which, being the most numerous in accordance with the definition of the mean electron, give rise to the signals of highest amplitude.

The oscillations resulting from the action of these electrons, are referred to as coherent oscillations and occur at discrete frequencies whose spacing within the spectrum depends upon the circuit characteristics.

These frequencies are these whose discrete nature is undesirable in a noise generator in which a continuous spectrum of the most random possible nature, both in terms of frequency and amplitude, is needed.

The low-amplitude signals are the result of the action of beam electrons whose characteristics are peripheral to the characteristics of the mean electrons hereinbefore referred to and which are responsible for the noise effect of the gun systems in electronic tubes. Numbering far fewer than the mean electrons, they produce signals of much lower amplitude. It is these signals which, when amplified, drown the discrete frequencies and produce the desired noise spectrum.

On the whole, the various stages through which the noise passes when the attenuation introduced by the attenuator 5 is reduced, can be summarized as follows (see FIG. 2):

High attenuation: the system oscillates weakly at one frequency, FIG. 2, I.

The attenuation is reduced.: the level of the output signal due to the oscillation increases until saturation is reached, FIG. 2, II.

The attenuation is still decreased: the main signal remains constant or falls off slightly, and new bands or lines appear, FIG. 2, III.

The attenuation continues to fall off: the travelling wave tube is heavily saturated, the bands multiply and become unstable, FIG. 2, IV.

The attenuation is reduced still further, the input amplitude being equal to the output amplitude: the signals break up into an intense noise pattern in which the peaks of the high-amplitude signals can still be detected.

When the attenuation reaches a very low value, the input level is higher than the output level and the travelling ave tube is then in a supersaturated condition, the output signal being constituted exclusively by noise, quasi-uniformly distributed throughout the band of amplification of the system. It will be observed, nevertheless, that there are zones of maximum signal level at the frequencies corresponding to the zones of minimum gain of the feedback loop (antiphase condition between output and input signals, FIG. 2, V).

It might be thought that, since the noise frequency pattern is the better, the more the attenuation introduced by the attenuator 5 is reduced, such attenuator serves no useful purpose in the device in accordance with the invention. However, it is essential both for regulating the noise level and for following distortions in the spectrum. It is also necessary in order to readjust the circuit at the time of replacement of one of the tubes.

The band filter enables the desired noise band to be selected. The invention as described in relation to the particular example chosen, makes it possible to produce high-level noise generators of very compact design.

Of course, the invention is not limited to the embodiment described and shown which was given solely by way of example.

What is claimed is:

1. A noise generator comprising a travelling wave tube, having an input and an output, a feedback loop between said input and said output; and means in said feedback loop for damping high-amplitude frequency components and for boosting to higher amplitude low-amplitude frequency components in which said means comprise a further travelling wave tube, connected in series with said first mentioned travelling wave tube.

2. A noise generator as claimed in claim 1, further comprising a variable attenuator connected in said feedback loop between the output of said second mentioned travelling wave tube and the input of said first mentioned travelling wave tube.

3. A noise generator as claimed in claim 2, wherein a band-pass filter is connected in series with said attenuator in said feedback loop.

References Cited

UNITED STATES PATENTS

| | | | |
|---|---|---|---|
| 3,178,655 | 4/1965 | Ries et al. | 331—78 |
| 3,369,191 | 2/1968 | Schram et al. | 331—78 |

ROY LAKE, Primary Examiner

S. H. GRIMM, Assistant Examiner

U.S. Cl. X.R.

331—82